(12) United States Patent
Li et al.

(10) Patent No.: US 11,531,131 B2
(45) Date of Patent: Dec. 20, 2022

(54) SEISMIC INTERPRETATION USING FLOW FIELDS

(71) Applicant: Schlumberger Technology Corporation, Sugar Land, TX (US)

(72) Inventors: Zhun Li, Houston, TX (US); Aria Abubakar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/248,259

(22) Filed: Jan. 15, 2021

(65) Prior Publication Data
US 2021/0223428 A1 Jul. 22, 2021

Related U.S. Application Data

(60) Provisional application No. 62/961,881, filed on Jan. 16, 2020.

(51) Int. Cl.
*G01V 1/34* (2006.01)
*G06N 20/00* (2019.01)
*G01V 1/30* (2006.01)

(52) U.S. Cl.
CPC .............. *G01V 1/345* (2013.01); *G01V 1/301* (2013.01); *G06N 20/00* (2019.01); *G01V 2210/64* (2013.01)

(58) Field of Classification Search
CPC .... G01V 1/345; G01V 1/301; G01V 2210/64; G06N 20/00
See application file for complete search history.

(56) References Cited

U.S. PATENT DOCUMENTS

| | | | |
|---|---|---|---|
| 2014/0236487 A1* | 8/2014 | Kimman ................ | G01V 1/366 702/18 |
| 2014/0301165 A1* | 10/2014 | Nichols ................. | G01V 1/303 367/52 |
| 2015/0253445 A1* | 9/2015 | Luo ........................ | G01V 1/345 702/16 |
| 2016/0116619 A1* | 4/2016 | Leiceaga ............... | G01V 1/003 367/72 |
| 2017/0256080 A1* | 9/2017 | Gu .......................... | E21B 7/00 |

OTHER PUBLICATIONS

Li, Z., Di, H., Maniar, H., and Abubakar, A. [2019] Semi-supervised deep learning assisted seismic image segmentation and stratigraphic sequence interpretation. Conference Proceedings, 81st EAGE Conference and Exhibition 2019, Jun. 2019, vol. 2019, p. 1-6.

Di, H., Li, Z., Maniar, H., and Abubakar, A. [2019] Seismic stratigraphy interpretation via deep convolutional neural networks. SEG Technical Program Expanded Abstracts 2019. San Antonio, TX Sep. 2019;2358-2362.

(Continued)

*Primary Examiner* — Raymond L Nimox

(57) ABSTRACT

A method for modeling a subsurface volume includes receiving a plurality of ordered seismic images including representations of objects in the subsurface volume, generating flow fields based on a difference between individual images of the plurality of ordered seismic images, and identifying the objects in the seismic images based on the flow fields and the plurality of ordered seismic images.

22 Claims, 14 Drawing Sheets

(56) References Cited

OTHER PUBLICATIONS

Geng, Z., Wu, X., Shi, Yunzhi., and Fomel, S. [2019] Relative geologic time estimation using a deep convolutional neural network. SEG Technical Program Expanded Abstracts 2019. San Antonio, TX Sep. 2019;2238-2242.

Fischer, P., Dosovitskiy, A., Ilg, E., Hausser, P., Hazirbas, C., Golkov, V., Smagt, P., Cremers, D., and Brox, T. [2015] Flowet: Learning Optical Flow with Convolutional Networks. 2015 IEEE International Conference on Computer Vision (ICCV), Dec. 7-13, 2015.

Hui, T., Tang, X., and Loy, C. [2018] LiteFlowNet: A Lightweight Convolutional Neural Network for Optical Flow Estimation. 2018 IEEE/CVF Conference on Computer Vision and Pattern Recognition.

\* cited by examiner

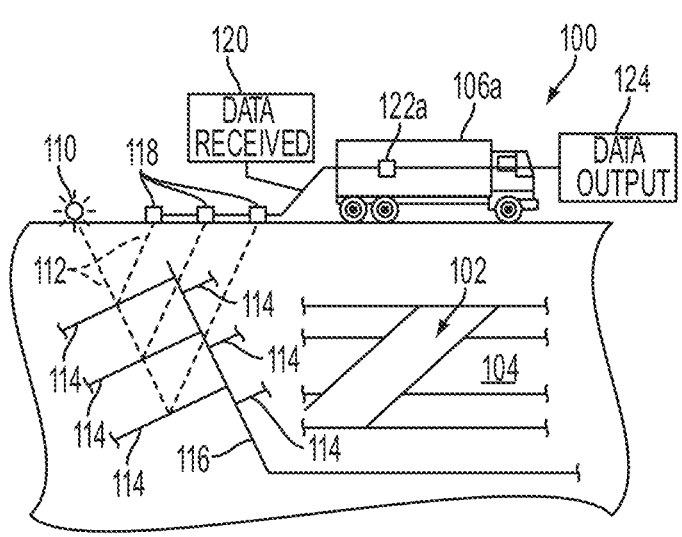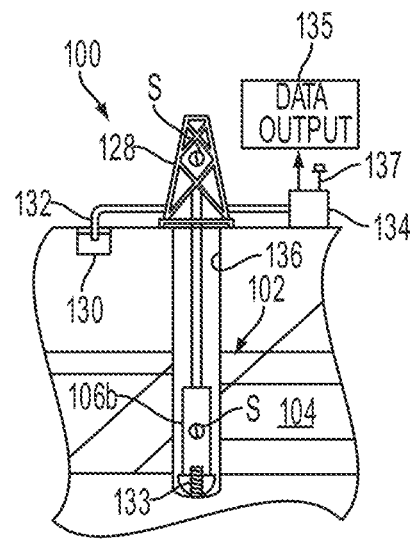
FIG. 1A    FIG. 1B
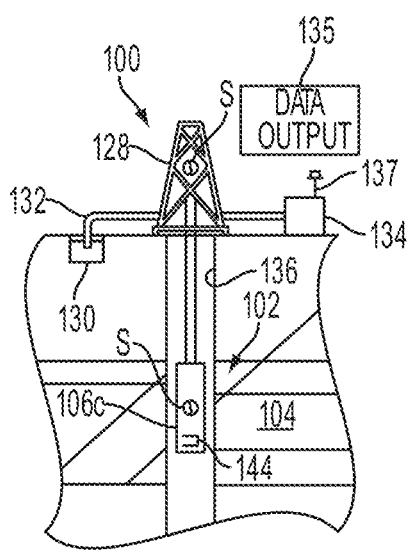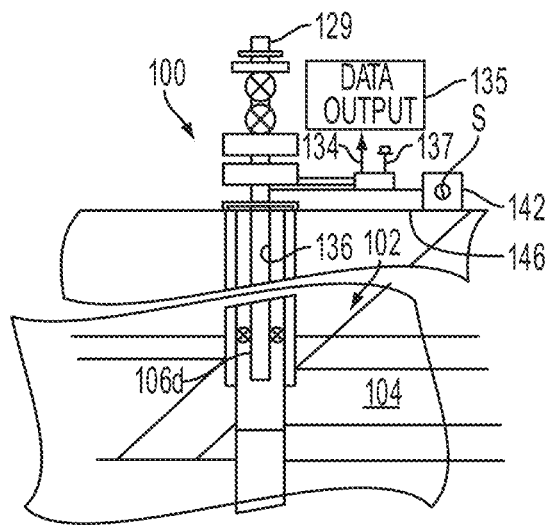
FIG. 1C    FIG. 1D

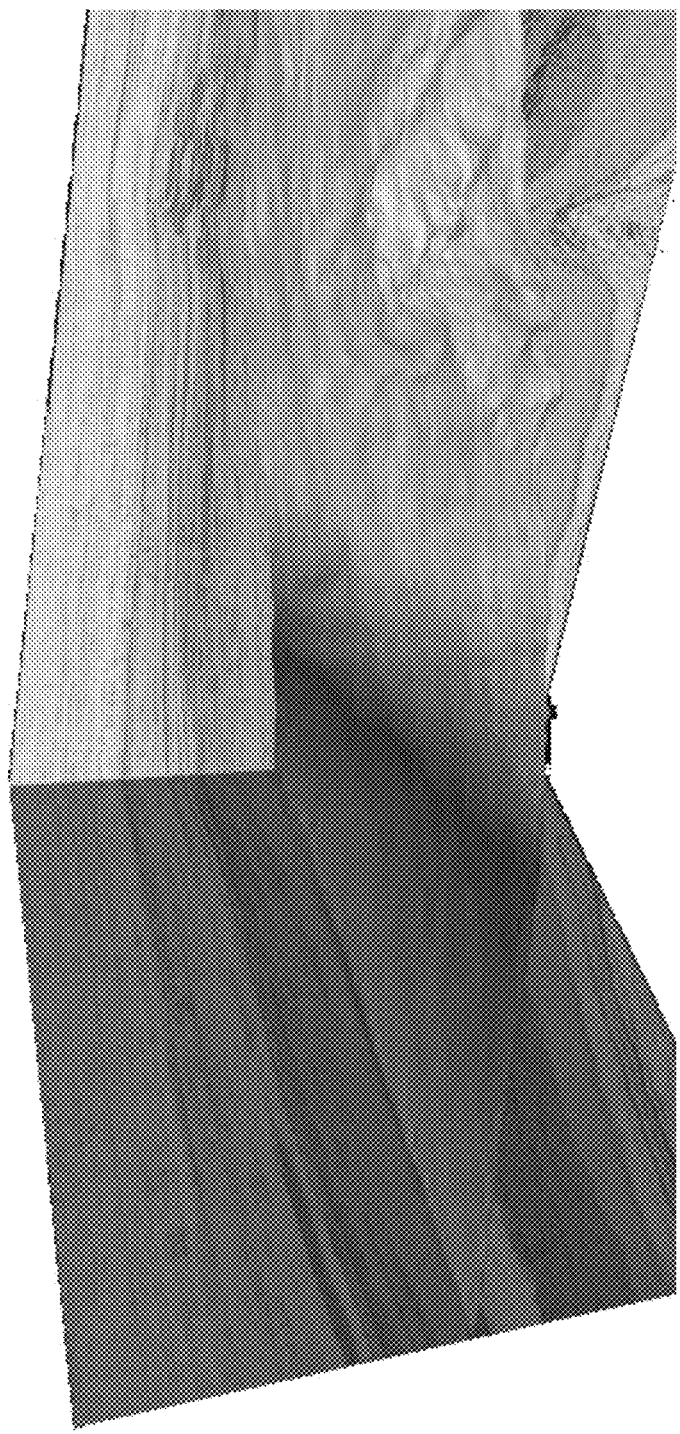

SEISMIC INTERPRETATION USING FLOW FIELDS

CROSS-REFERENCE TO RELATED APPLICATIONS

This application claims priority to U.S. Provisional Patent Application Ser. No. 62/961,881, which was filed on Jan. 16, 2020. The entirety of this provisional application is incorporated herein by reference.

BACKGROUND

Seismic image segmentation, stratigraphic sequence interpretation, and horizon tracking are used in subsurface interpretation and earth model building. Deep convolutional neural networks and other machine learning models may be used as a potential solution for at least some seismic interpretation, e.g., automatic seismic image segmentation and horizon tracking. Although different machine learning methods have been implemented, they generally call for a tradeoff between the number of high-quality manual labels (and thus human intervention) and the complexity of geological structures the deep learning model can interpret. That is, a large, robust training corpus of manual interpretations may be called for to train a machine learning model to accurately predict highly complex geological structures. Furthermore, these methods are generally not flexible enough to address tasks such as dense horizon extraction and generation of relative geological age volume.

SUMMARY

Embodiments of the disclosure include a method for modeling a subsurface volume includes receiving a plurality of ordered seismic images including representations of objects in the subsurface volume, generating flow fields based on a difference between individual images of the plurality of ordered seismic images, and identifying the objects in the seismic images based on the flow fields and the plurality of ordered seismic images.

Embodiments of the disclosure also include a non-transitory computer-readable medium storing instructions that, when executed by at least one processor of a computing system, cause the computing system to perform operations, the operations including receiving a plurality of ordered seismic images including representations of objects in a subsurface volume, generating flow fields based on a difference between individual images of the plurality of ordered seismic images, and identifying the objects in the seismic images based on the flow fields and the plurality of ordered seismic images.

Embodiments of the disclosure further include a computing system including at least one processor, and a memory system including one or more non-transitory computer-readable media storing instructions that, when executed by at least one of the one or more processors, cause the computing system to perform operations. The operations include receiving a plurality of ordered seismic images including representations of objects in a subsurface volume, generating flow fields based on a difference between individual images of the plurality of ordered seismic images, and identifying the objects in the seismic images based on the flow fields and the plurality of ordered seismic images.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 9 illustrates a perspective view of a visualization of a horizon defined using flow fields, according to an embodiment.

DESCRIPTION OF EMBODIMENTS

Figure 2:
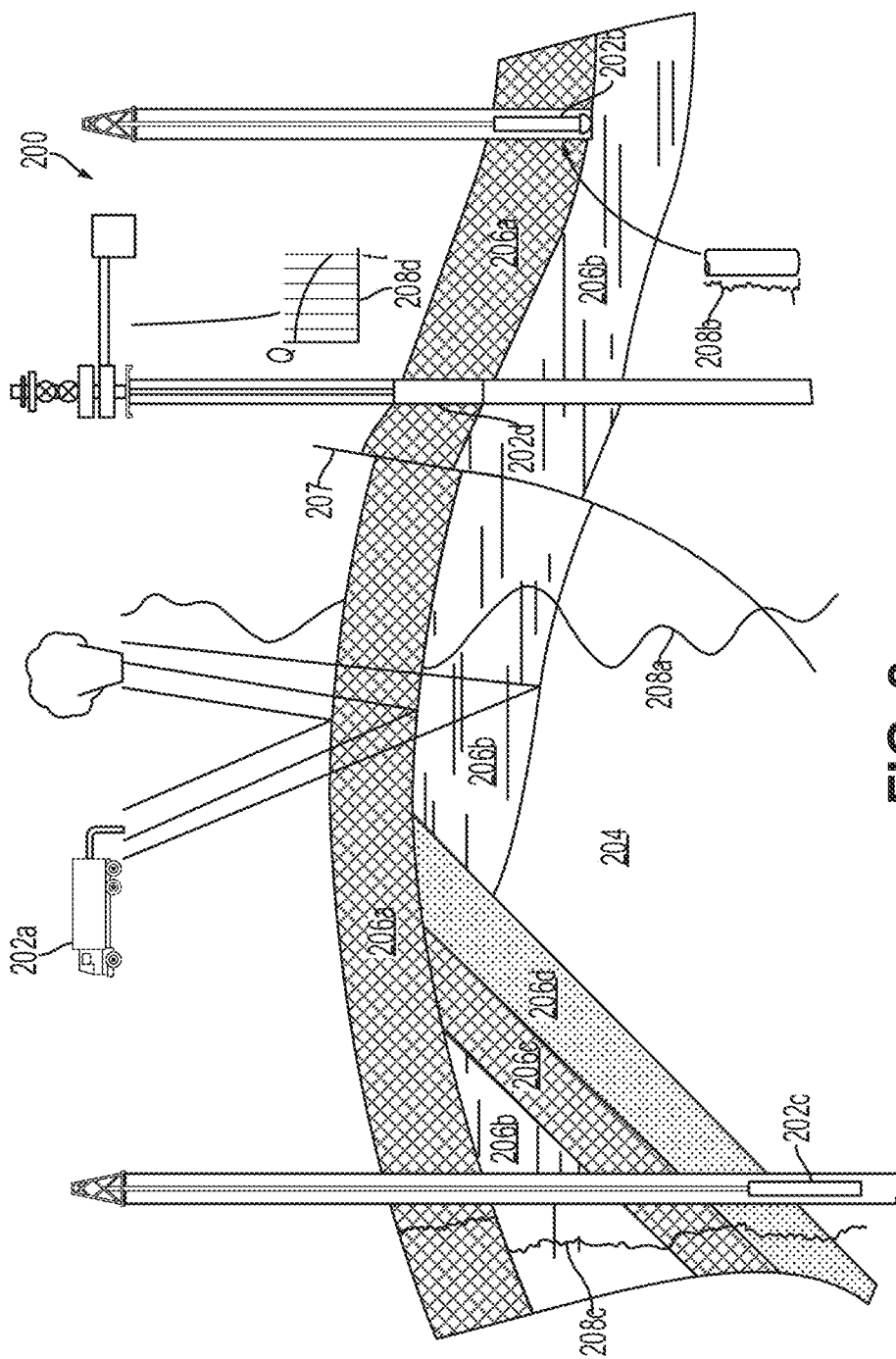

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention.

The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
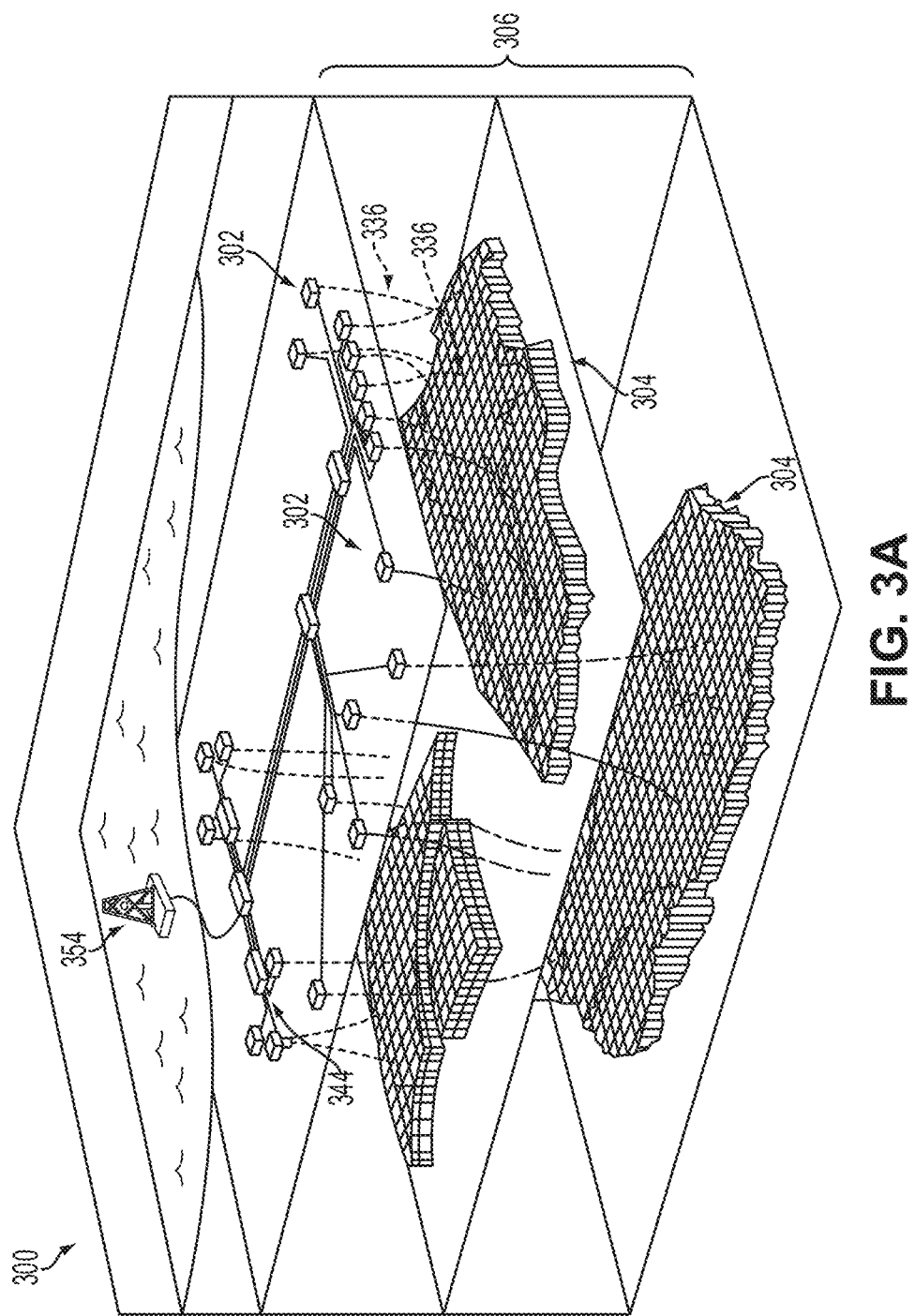

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
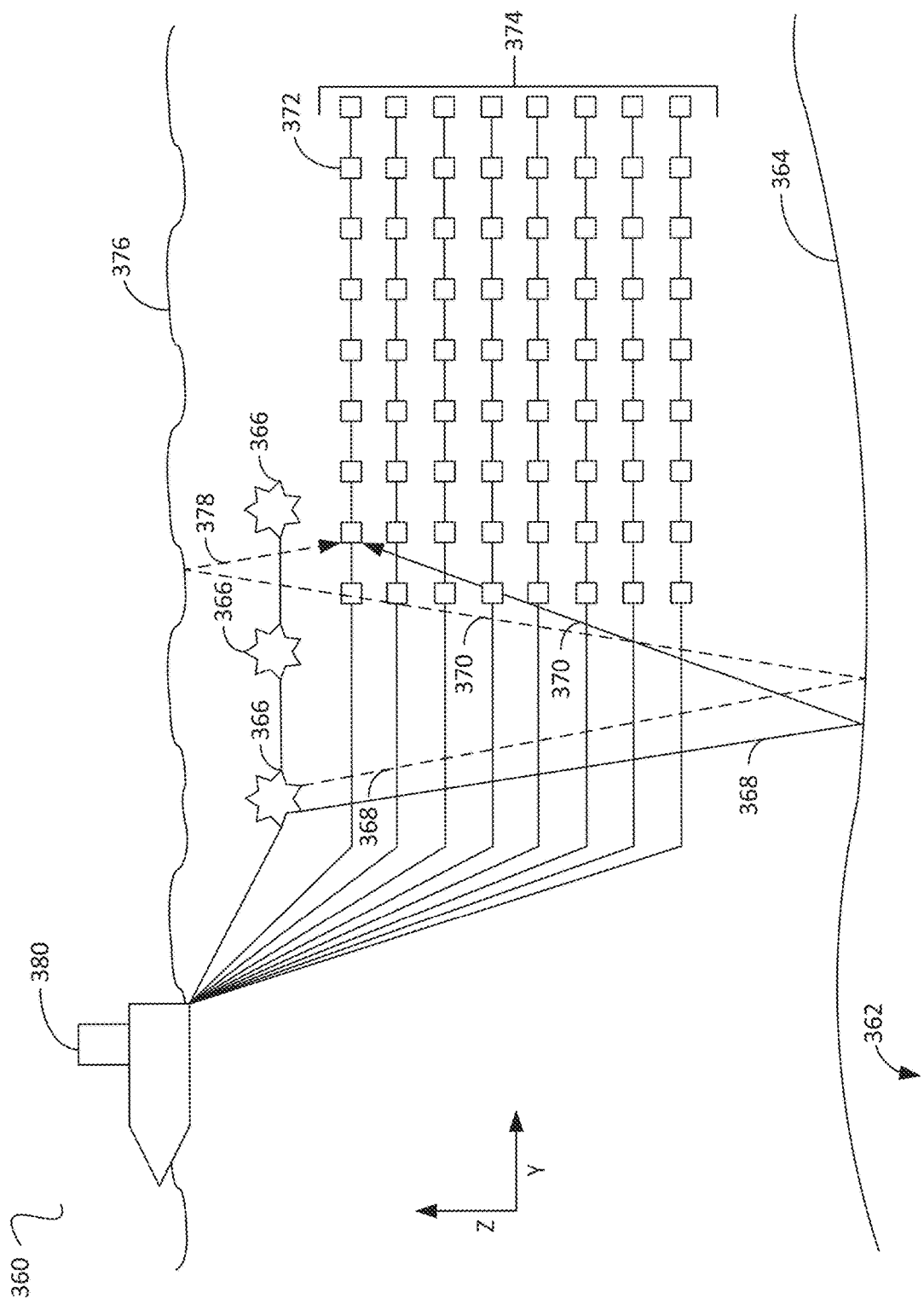

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
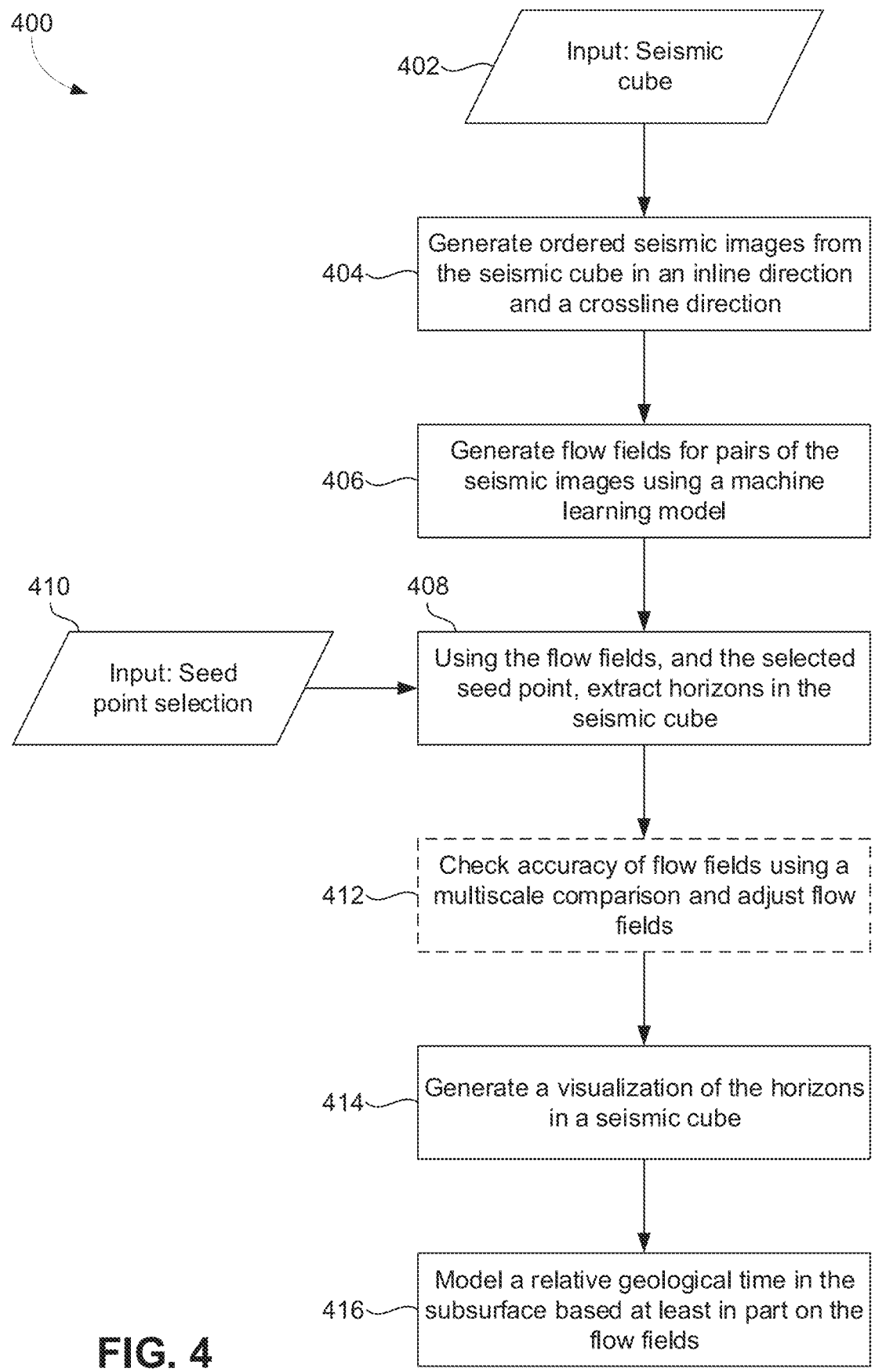
FIG. 4 illustrates a flowchart of a method for seismic interpretation, according to an embodiment.

FIG. 4 illustrates a flowchart of a method 400 for seismic interpretation, according to an embodiment. The method 400 may, in at least some embodiments, implement machine learning models and self-learning techniques that may avoid calling for large sets of manual or strictly algorithm-based labeling. Accordingly, the method 400 may include receiving seismic data as an input, as at 402. The seismic data may be a three-dimensional seismic survey of a subterranean volume, e.g., a cube having an inline direction, cross-line direction, and a time or depth direction. FIGS. 5A-5D illustrate an example of such a cube 500, and identify the directions just mentioned.

Figure 5D:
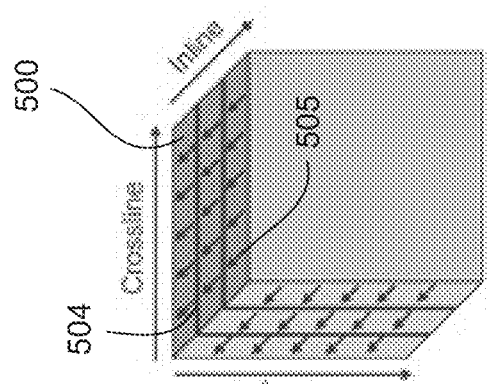
FIGS. 5A, 5B, 5C, 5D illustrate different views of a seismic cube defining a plurality of slices in two directions on an inline axis and in two directions on crossline axis, according to an embodiment.
Figure 5C:
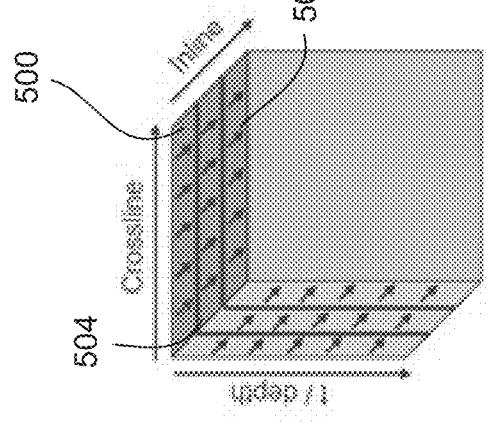
Figure 5B:
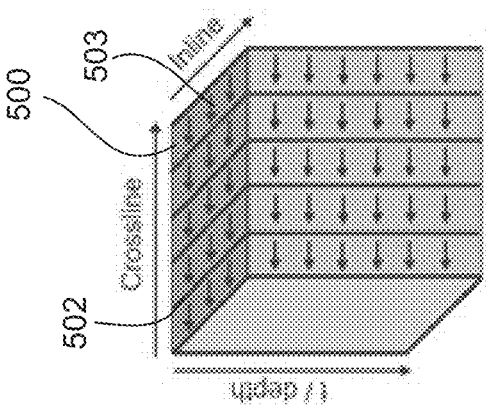
Figure 5A:
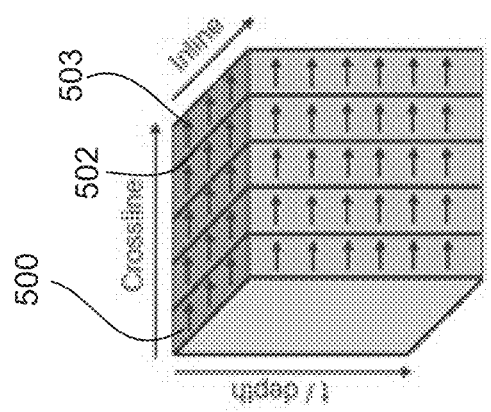

The method 400 may also include generating ordered seismic images or "slices" from the seismic cube in an inline direction and a crossline direction, as at 402. Referring again to FIGS. 5A and 5B, the cube 500 defines slices 502 in the crossline axis. The slices 502 are generally parallel to one another and offset by some distance from one another. The distance may vary depending on constraints such as memory, seismic resolution, etc. The slices 502 are "ordered" in the sense that, in the cube 500, the slices 502 are positioned sequentially along an axis, and may be numbered sequentially, such that one slice 502 cannot be switched with another slice 502 and the order maintained. The difference between pixel locations in adjacent slices 502 is represented (e.g., defines) a flow field 503. Referring to FIGS. 5C and 5D, slices 504 are defined in the inline axis, again generally parallel to one another, with a difference between adjacent slices 504 defining a flow field 505. Further, the direction along which one proceeds between slices 502, 504 (e.g., to the left or right in the crossline direction, or into or out of the page in the inline direction) may play a factor in the method 400, as will be described in greater detail below.

Figure 6:
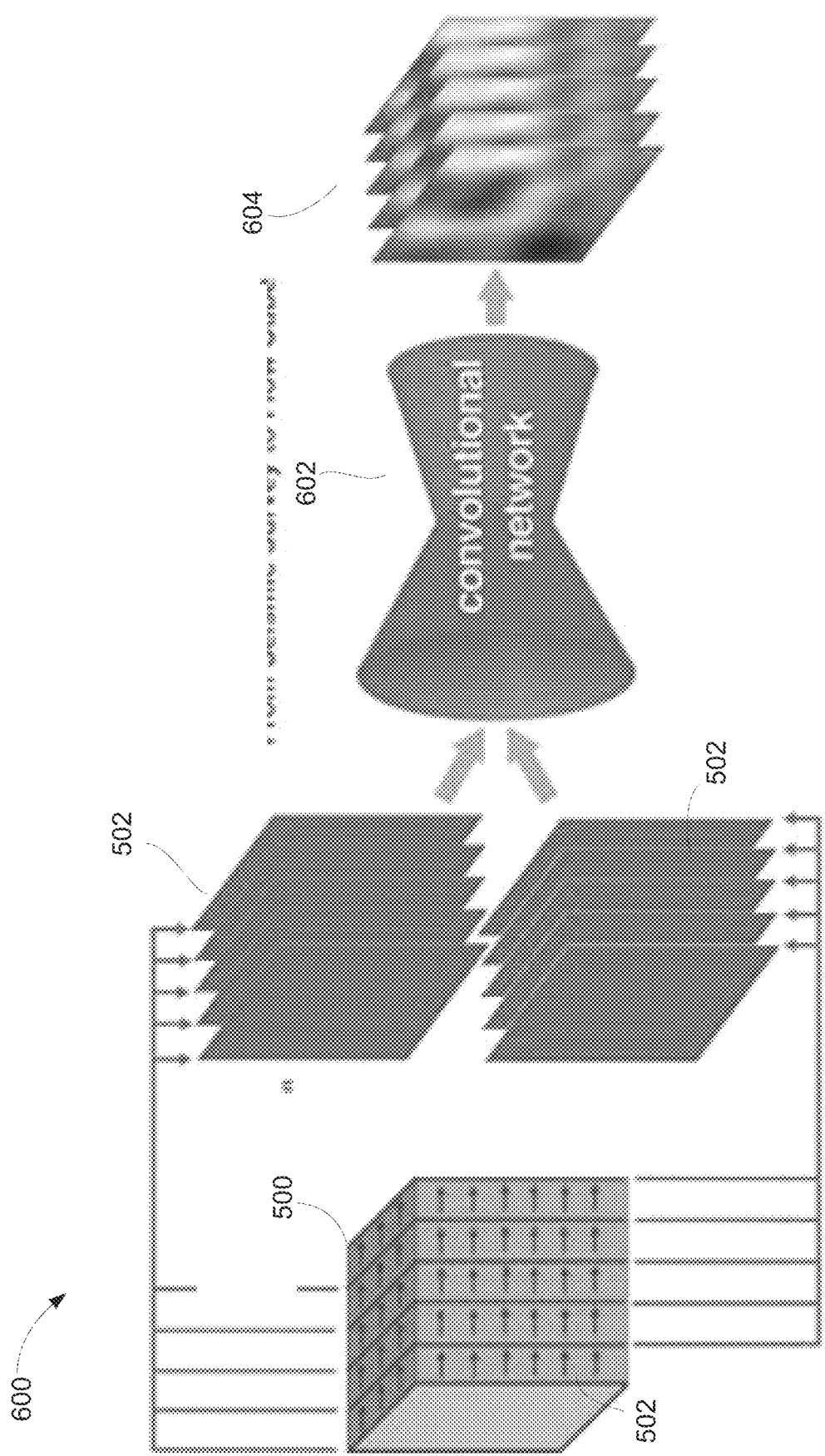
FIG. 6 illustrates a functional diagram of a system for executing the method of FIG. 4, according to an embodiment.

Reference is additionally made to FIG. 6, which illustrates a functional diagram of a system 600 for executing at least a portion of the method 400, according to an embodiment. As shown, the slices 502 are defined in the crossline direction of the cube 500, thereby generating a plurality of ordered seismic images. It will be appreciated that the slices 504 may likewise be generated in the inline direction and stored as ordered seismic images.

Once the two-dimensional seismic images 502, 504 are generated, the method 400 may proceed to generating flow fields 604 for pairs of the seismic images using a machine learning model 602, as at 406 (FIG. 4). In some embodiments, flow fields 604 may be defined for each adjacent pair of seismic images (such that there may be N−1 flow fields, produced for N seismic images). The flow fields 604 may be ordered, e.g., with the first flow field 604 corresponding to the first and second slices 502, etc. As shown, the machine learning model 602 may be a convolution network, and in one specific embodiment, an encoder-decoder architecture may be employed. The machine learning model 602 may be trained to produce (e.g., single channel) flow fields 604 for each of (or any subset of) the pairs of seismic images. The flow fields 604 may each be a 2D image with the same size as the input seismic slices 502, 504.

By way of explanation, flow fields represent a dense pixel-to-pixel correspondence between two consecutive "frames", generally in video imagery, and in this case, considering the seismic slices as the frames and the seismic cube as the video. A given flow field may thus provide a 2-D vector at each pixel location of a frame, representing the instantaneous motion of pixels from one frame to the next frame. By tracking optical flow, the location of a pixel in a first frame (or, the location of the object partially represented in the pixel) can be determined for a second frame. In general, optical flow can be used to track the motion of a particular point when moving through the frames. The corresponding optical flow field represents the pixel-wise movement speed and direction from one frame to the next. Similarly, the flow field between two adjacent slices of seismic survey can indicate pixel-wise movement of the sediments from one slice to the next.

In some embodiments, the flow fields 604 may be direction-dependent. For example, flow fields 604 created as proceeding on one direction (e.g., right) in the crossline axis may, in practice, be somewhat different from flow fields 604 created as proceeding in the opposite (e.g., left) direction in the crossline axis. The same may be true in the inline axis. Accordingly, as part of generating the flow fields 604, the method 400 may, in some embodiments, combine corresponding flow fields 604 created as proceeding in opposing directions, e.g., by taking an average value between the two flow fields 604.

Figures 7A, 7B, 7C:
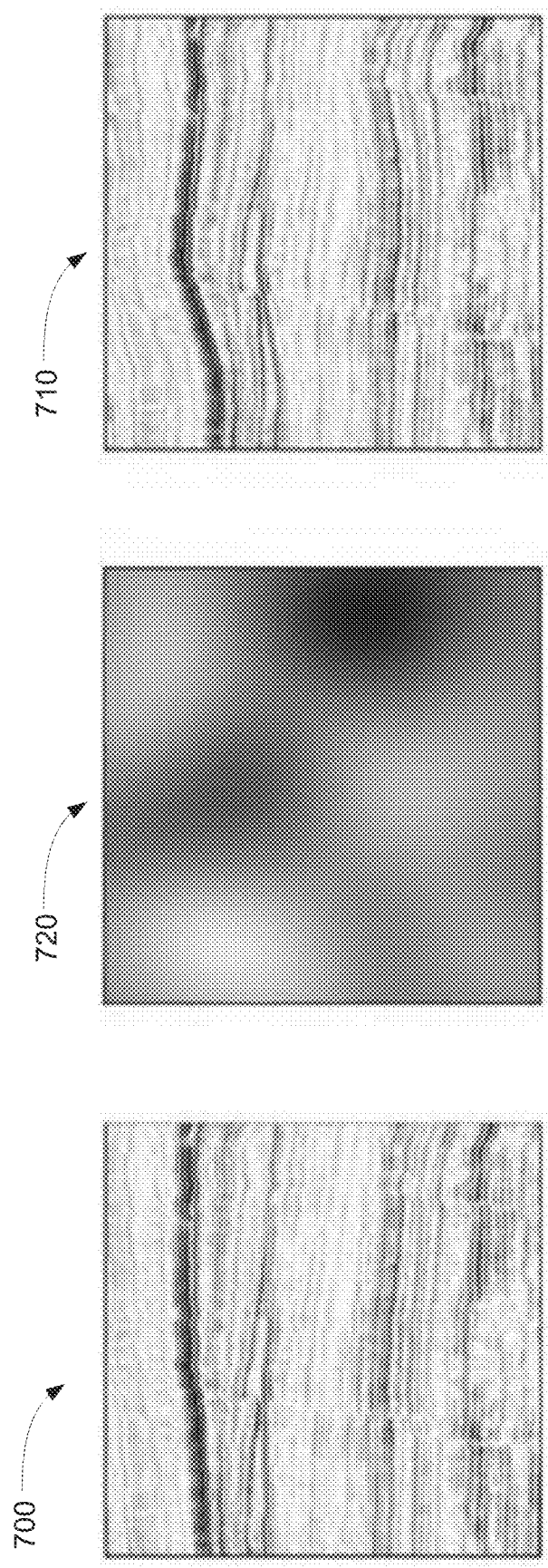
FIG. 7A illustrates a first seismic image.
FIG. 7B illustrates a flow field.
FIG. 7C illustrates a second seismic image representing a combination of the first seismic image and the flow field.

To better illustrate the flow fields 604 and their relationship to seismic images 502, 504, reference is made to FIGS. 7A, 7B, and 7C. A first seismic image 700 is shown in FIG. 7A. A second seismic image 710 is shown in FIG. 7C. A flow field 720 is shown in FIG. 7B. The flow field 720 provides a pixel-wise, vector representation of the difference between images 710 and 720. On this basis, a complete sediment or horizon can be tracked using the flow field by moving through the seismic slices, as will be described in greater detail below.

Referring again to FIG. 6, different types of deep learning architectures may be used for the machine learning model 602. For example, a shared weight network, encoder-decoder type network, image cross-correlation layer, or warping layer for flow refinement may be used. In a specific embodiment, an encoder-decoder type network with multi-resolution shared weight feature layers and cross correlation layers may be used.

Referring back to FIG. 4, having generated the flow fields at 406, the method 400 may proceed to using the flow fields, and a seed point, to extract (e.g., define and track) horizons (or sediments) in the seismic cube, as at 408. The seed points may be selected by a user, e.g., viewing a visualization of one or more slices on a computer screen and using an input device (e.g., mouse), as at 410. In other embodiments, seed points may be selected in other ways, e.g., automatically.

Figure 8A:
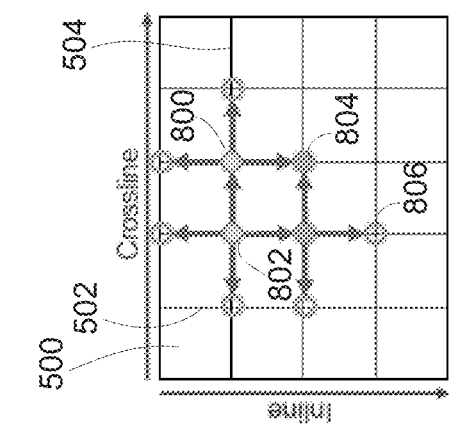
FIGS. 8A, 8B, 8C, and 8D illustrate conceptual views of horizon tracking using flow fields, according to an embodiment.
Figure 8B:
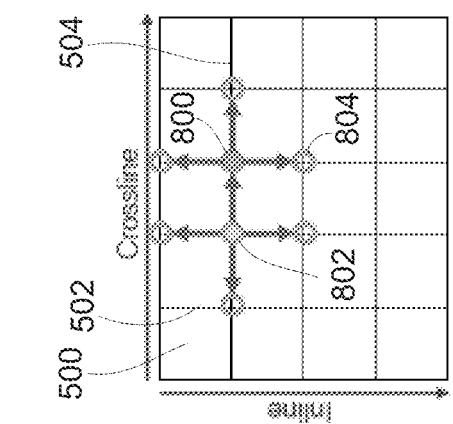
Figure 8C:
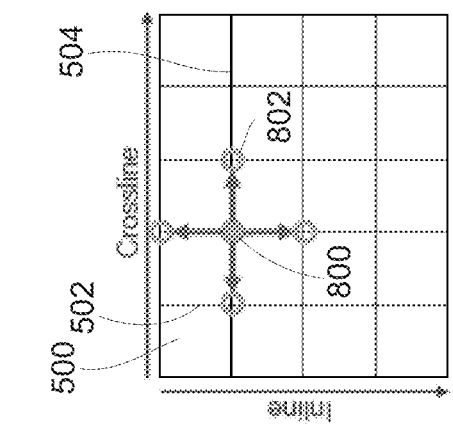
Figure 8D:
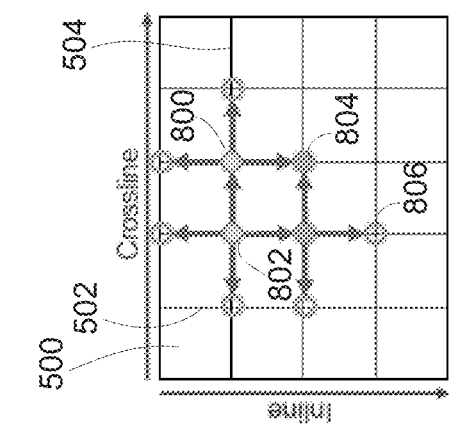

FIGS. 8A-8D illustrate how the horizons may be tracked across slices 502, 504 in the cube 500 starting with a seed point 800, according to an embodiment. As shown in FIG. 8A, the seed point 800 is selected or otherwise identified. The seed point 800 may be selected in a displayed slice, either or both in the inline and/or crossline axes. The corresponding location of this pixel, e.g., the object (horizon) represented by it, may then be tracked as between slices 502, 504 in the inline and crossline axes. Thus, using the flow fields, which describe the movement of such pixels, in FIG. 8B, the locations 802 corresponding to the seed point 800 are selected in the next adjacent slice 502, 504 in both crossline and inline axes. This may then be repeated, as shown in FIG. 8C, for the next adjacent inline and crossline slices 502, 504, thereby extracting additional locations 804, and the repeated again to identify locations 806, as shown in FIG. 8D. It will be appreciated that as a corresponding location 802, 804, 806 is selected, it may be removed as a potential seed point for subsequent analysis.

In some embodiments, the method 400 may further include checking accuracy of the flow fields using a multi-scale comparison and adjusting the flow fields, and/or the machine learning model, accordingly, as at 412. For example, two flow fields may be determined as between a set of three consecutive slices. Further, a third flow field may be determined as between the first and third of the three consecutive slices, with the first and third slices being separated by the second slice. The combination of the first and second flow fields thus should be the same as the third flow field, unless an error was introduced in the calculation at some point. If such an error is apparent, one or more of the flow fields may be adjusted and/or the machine learning model may be adjusted. It will be appreciated that the larger scale flow field (above, between the first and last of the set of three) may be calculated between images with any number of slices therebetween.

At 414, the method 400 may include generating a visualization of the horizons (or other objects) in the seismic cube, e.g., as extracted at 408. These visualizations may be two or three dimensional, and may illustrate a selected horizon, for example, e.g., as identified from a seed point, depth, time, or in any other manner. FIG. 9 illustrates an example of such a horizon.

Figure 10:
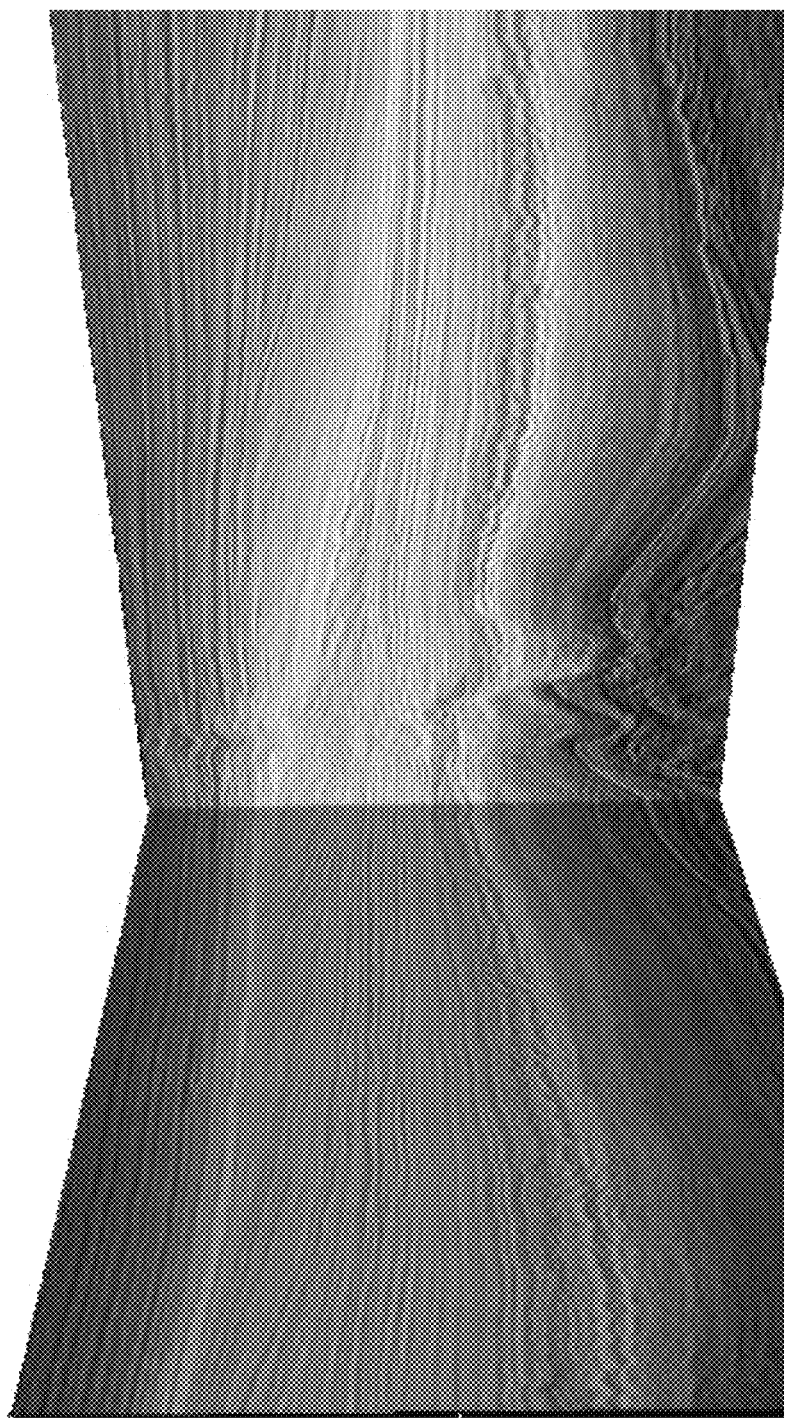
FIG. 10 illustrates a three-dimensional visualization of a relative geological time determined based at least partially on horizons tracked using flow fields, according to an embodiment.

At 416, the method 400 may include generating a relative geological time for the subsurface domain. The relative geological time may be generated based at least in part on the horizons that are identified. For example, the method 400 may include interpolating the time periods between horizons, e.g., at a sub-seismic resolution or even on a continuous/infinite basis, e.g., as a function of the number, geometry, etc. of the horizons between two given points. As a result, the model may be able to define the relative geological age of the subsurface as a function of depth (or time) in the cube. The geological age may be visualized as shown in FIG. 10, with horizons indicated. The geological time may be a fourth dimension of the visualized model, e.g., using a color spectrum to indicate relative age.

In some embodiments, relative geological time (e.g., in three dimensions) may be generated by tracking from a seed trace. A seed trace may have relative geological time values assigned to each voxel of the trace itself. The RGT value may be the index (e.g., the order in which the voxel appears in a particular axis, relative to the other voxels of the trace) of each voxel. The RGT value of one of the adjacent traces of the seed trace can be obtained by interpolating the seed trace RGT based on the flow field between seed trace and the adjacent trace. Then the RGT value for the other traces in a seismic survey 500 may then calculated according to the flood fill algorithm illustrated in FIGS. 8A-D and described above in the context of horizon (or other object) tracking.

Figure 11:
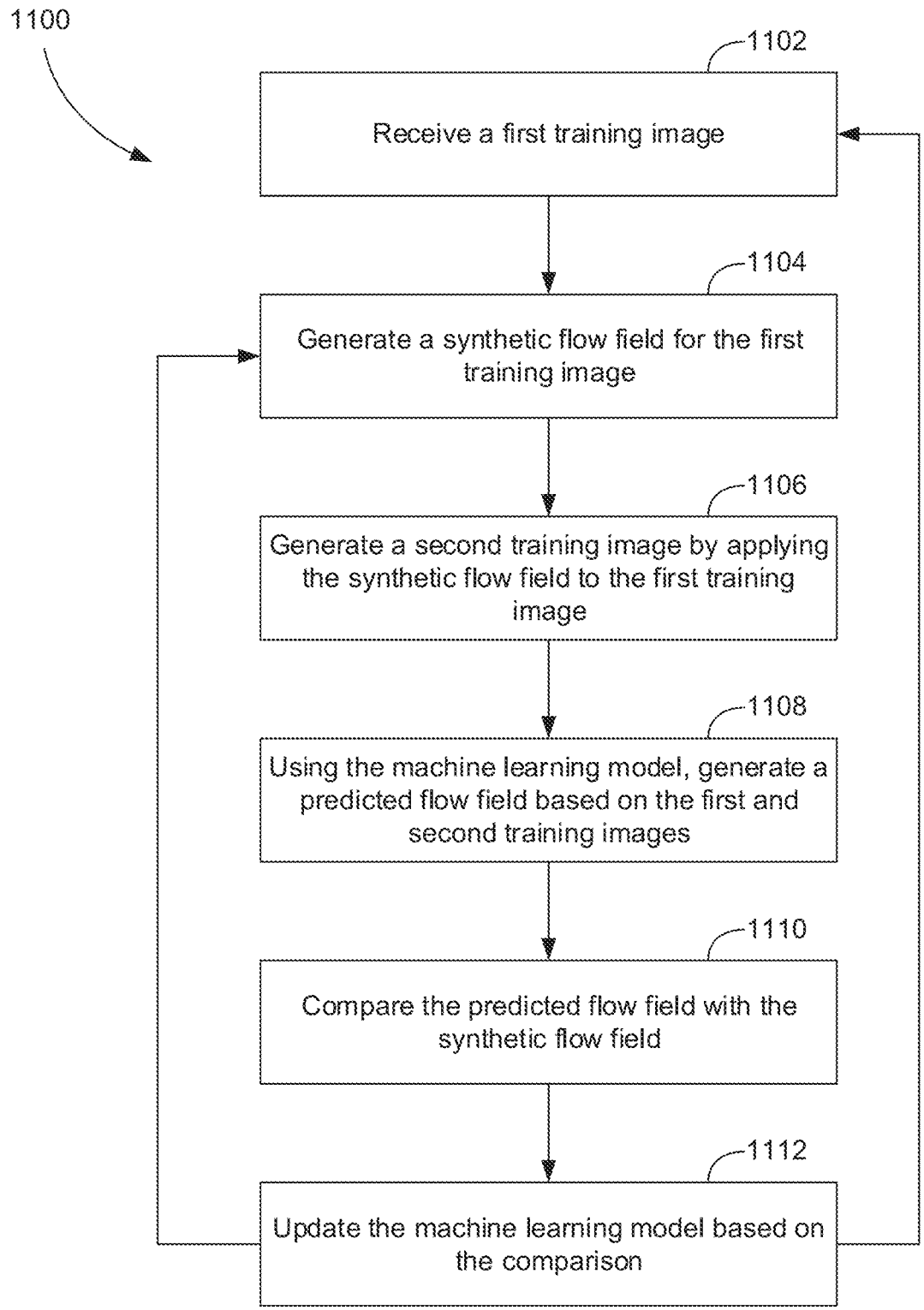
FIG. 11 illustrates a flowchart of a method for training a machine learning model to generate flow fields for seismic images, according to an embodiment.

In order to perform the method 400, the machine learning model is trained. FIG. 11 illustrates a method 1100 for training the machine learning model, according to an embodiment. The method 1100 may begin by receiving (selecting, etc.) a first training image, as at 1102. The first training image may be a slice from a cube, as discussed above.

The method 1100 may then include generating a synthetic flow field for the first training image, as at 1104. The synthetic flow field may be generated as random noise. For example, a random noise image, the same size as the first training image, may be created, e.g., with each pixel thereof having a random number between −1 and 1. A Gaussian kernel may then be applied to produce a smoothed version, and a flow field may be obtained by multiplying the smoothed noise image by a scaling factor. The standard deviation of the Gaussian kernel and the scaling factor may be randomly selected from a predetermined range, with greater standard deviations resulting in more tortuous deformation. The scaling factor may permit control of the magnitude of the flow vector.

The synthetic flow field may then be applied to the first training image to generate a second training image, as at 1106. The first and second training images may then be fed to the machine learning model. The machine learning model may generate a predicted flow field, as at 1108. The predicted flow field may be compared with the synthetic flow field, e.g., to produce a loss function, as at 1110, and the results of this comparison may be employed to adjust/train the machine learning model, as at 1112. Additional training couples (first and second images) may then be created by either selecting a new first training image, generating a new synthetic flow field, or both.

Figure 12:
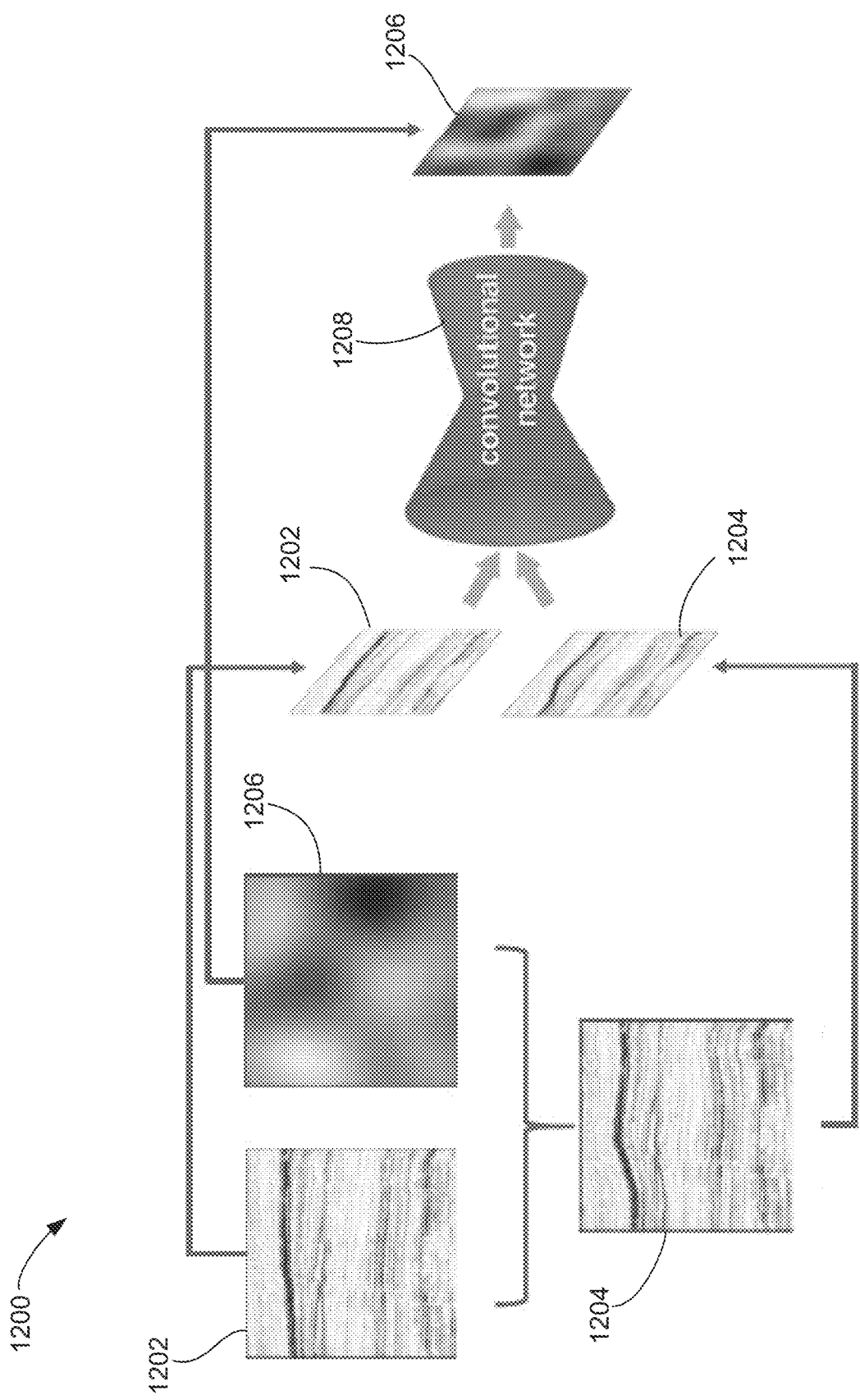
FIG. 12 illustrates a functional diagram of system for executing the method for training the machine learning model, according to an embodiment.

Referring now to FIG. 12, a functional diagram of a system 1200 for executing the method 1100 is shown. As mentioned above, a first training image 1202 is provided, and a synthetic flow field 1204 is generated, e.g., at random. The synthetic flow field 1204 may be applied to the first training image 1202 to produce a second training image 1206. The first and second training images 1202, 1204 may then be fed to a machine learning model 1208 (e.g., the machine learning model 602), which may generate a predicted flow field 1208. The predicted flow field 1208 may then be compared with the synthetic flow field 1206, and a difference therebetween used to train the machine learning model 1204. Accordingly, the randomly-generated synthetic flow field 1204 may serve as the ground truth for the training of the machine learning model. As will be appreciated, a result of this may be the automated generation of training couples from seismic images and randomly-generated flow fields. Thus, human labeling for training purposes may be avoided or at least reduced.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 13:
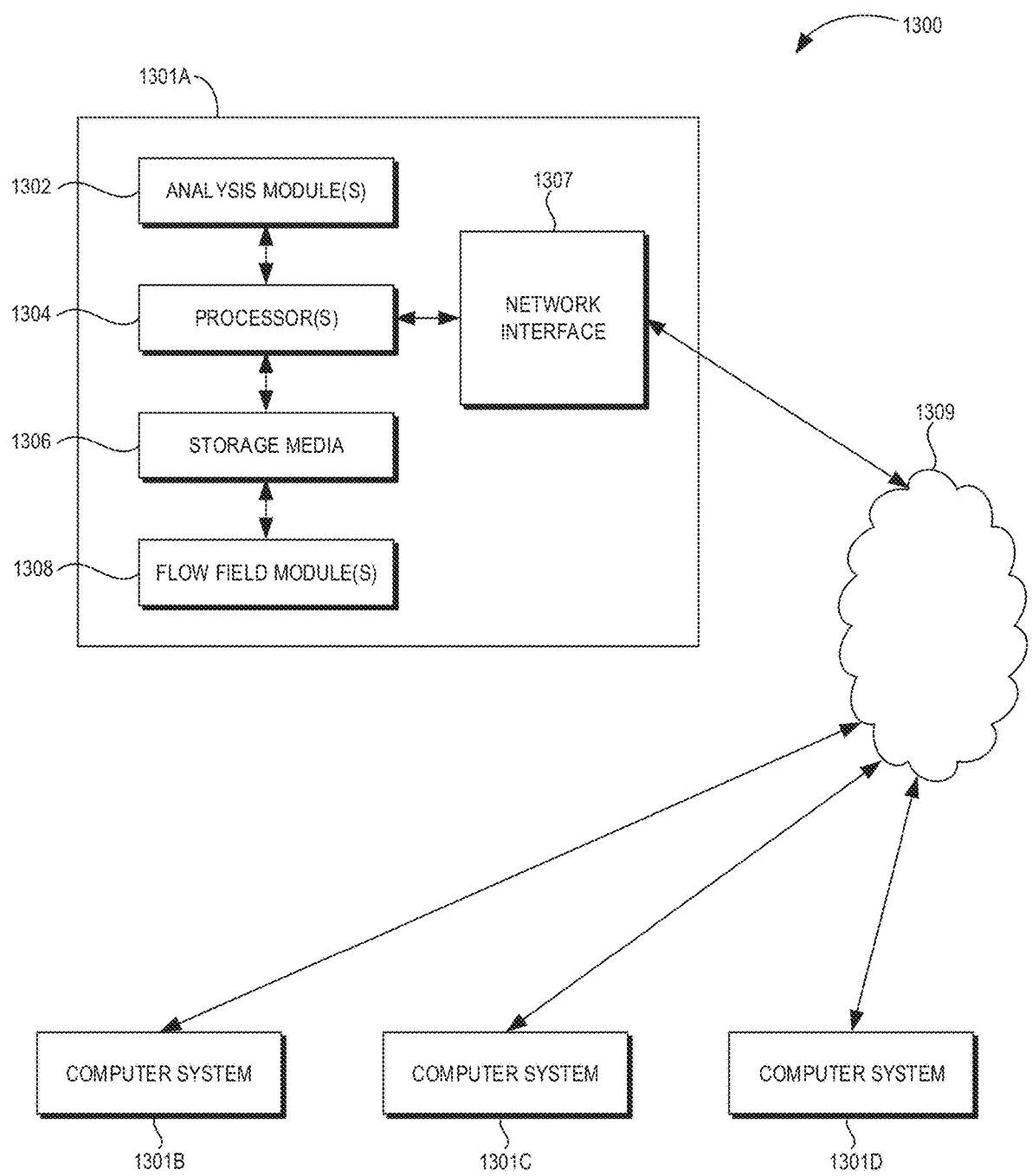
FIG. 13 illustrates a schematic view of a computing system, according to an embodiment.

In some embodiments, any of the methods of the present disclosure may be executed by a computing system. FIG. 13 illustrates an example of such a computing system 1300, in accordance with some embodiments. The computing system 1300 may include a computer or computer system 1301A, which may be an individual computer system 1301A or an arrangement of distributed computer systems. The computer system 1301A includes one or more analysis module(s) 1302 configured to perform various tasks according to some embodiments, such as one or more methods disclosed herein. To perform these various tasks, the analysis module 1302 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor can include a microprocessor, microcontroller, processor module or subsystem, programmable integrated circuit, programmable gate array, or another control or computing device.

The storage media 1306 can be implemented as one or more computer-readable or machine-readable storage media. Note that while in the example embodiment of FIG. 13 storage media 1306 is depicted as within computer system 1301A, in some embodiments, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1300 contains one or more horizon tracking module(s) 1308. In the example of computing system 1300, computer system 1301A includes the horizon tracking module 1308. In some embodiments, a single horizon tracking module may be used to perform some or all aspects of one or more embodiments of the methods. In alternate embodiments, a plurality of horizon tracking modules may be used to perform some or all aspects of methods.

It should be appreciated that computing system 1300 is only one example of a computing system, and that computing system 1300 may have more or fewer components than shown, may combine additional components not depicted in the example embodiment of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Seismic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1300, FIG. 13), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for modeling a subsurface volume, comprising:
   training a machine learning model to generate flow fields based at least partially upon a first training seismic image and a second training seismic image;
   receiving a plurality of ordered seismic images comprising representations of objects in the subsurface volume;
   generating the flow fields using the trained machine learning model based on a difference between individual images of the plurality of ordered seismic images; and
   identifying the objects in the seismic images based on the flow fields and the plurality of ordered seismic images.

2. The method of claim 1, wherein generating the flow fields comprises comparing a first seismic image of the plurality of ordered seismic images with a second seismic image of the plurality of ordered seismic data to determine displacement vectors for pixels of the first seismic image that define the difference between pixel location in the first and second seismic images, wherein the flow field represents the displacement vectors for the pixels.

3. The method of claim 1, wherein generating the flow fields comprises:
   generating a first flow field in an inline direction; and
   generating a second flow field in a crossline direction, wherein identifying the objects comprises identifying the objects in both the inline direction and the crossline direction.

4. The method of claim 3, wherein generating the flow fields further comprises:
   generating a third flow field in a second inline direction;
   combining the first and third flow fields;
   generating a fourth flow field in a second crossline direction; and
   combining the second and fourth flow fields.

5. The method of claim 1, wherein the objects comprise horizons, and wherein identifying the horizons comprises:
   receiving a selection of a seed point in one of the plurality of ordered seismic images, the seed point corresponding to a part of the object; and
   tracking the object in an inline axis and a crossline axis in the plurality of ordered seismic images using the flow field.

6. The method of claim 1, further comprising generating a relative geological time based at least in part on the flow fields.

7. The method of claim 1, wherein the object is a horizon in the subsurface volume.

8. The method of claim 1, further comprising:
   receiving the first training seismic image;
   generating a synthetic flow field;
   generating the second training seismic image by combining the first training seismic image with the synthetic flow field;
   generating a predicted flow field based on the first training seismic image and the second training seismic image, using the machine learning model;

comparing the predicted flow field with the synthetic flow field; and training the machine learning model based on the comparison between the predicted flow field and the synthetic flow field.

9. The method of claim 1, further comprising:

generating a first flow field between a first seismic image of the plurality of ordered seismic images and a second seismic image of the plurality of ordered seismic images, wherein the first and second seismic images are adjacent in the plurality of ordered seismic images;

generating a second flow field between the second seismic image and a third seismic image of the plurality of ordered seismic images, wherein the third seismic image and the first seismic image are not adjacent in the plurality of ordered seismic images;

generating a third flow field between the first and third seismic images;

comparing the third flow field with a combination of the first and second flow fields; and adjusting the first flow field, the second flow field, or both based on the comparison.

10. A non-transitory computer-readable medium storing instructions that, when executed by at least one processor of a computing system, cause the computing system to perform operations, the operations comprising:

training a machine learning model to generate flow fields based at least partially upon a first training seismic image and a second training seismic image;

receiving a plurality of ordered seismic images comprising representations of objects in a subsurface volume;

generating the flow fields using the trained machine learning model based on a difference between individual images of the plurality of ordered seismic images; and identifying the objects in the seismic images based on the flow fields and the plurality of ordered seismic images.

11. The medium of claim 10, wherein generating the flow fields comprises comparing a first seismic image of the plurality of ordered seismic images with a second seismic image of the plurality of ordered seismic data to determine displacement vectors for pixels of the first seismic image that define the difference between pixel location in the first and second seismic images, wherein the flow field represents the displacement vectors for the pixels.

12. The medium of claim 10, wherein generating the flow fields comprises:

generating a first flow field in an inline direction; and generating a second flow field in a crossline direction, wherein identifying the objects comprises identifying the objects in both the inline direction and the crossline direction.

13. The medium of claim 12, wherein generating the flow fields further comprises:

generating a third flow field in a second inline direction;

combining the first and third flow fields;

generating a fourth flow field in a second crossline direction; and combining the second and fourth flow fields.

14. The medium of claim 10, wherein the objects comprise horizons, and wherein identifying the horizons comprises:

receiving a selection of a seed point in one of the plurality of ordered seismic images, the seed point corresponding to a part of the object; and tracking the object in an inline axis and a crossline axis in the plurality of ordered seismic images using the flow field.

15. The medium of claim 10, wherein the operations further comprise generating a relative geological time based at least in part on the flow fields.

16. The medium of claim 10, wherein the object is a horizon in the subsurface volume.

17. The medium of claim 10, wherein the operations further comprise:

receiving the first training seismic image;

generating a synthetic flow field;

generating the second training seismic image by combining the first training seismic image with the synthetic flow field;

generating a predicted flow field based on the first training seismic image and the second training seismic image, using the machine learning model;

comparing the predicted flow field with the synthetic flow field; and training the machine learning model based on the comparison between the predicted flow field and the synthetic flow field.

18. The medium of claim 10, wherein the operations further comprise:

generating a first flow field between a first seismic image of the plurality of ordered seismic images and a second seismic image of the plurality of ordered seismic images, wherein the first and second seismic images are adjacent in the plurality of ordered seismic images;

generating a second flow field between the second seismic image and a third seismic image of the plurality of ordered seismic images, wherein the third seismic image and the first seismic image are not adjacent in the plurality of ordered seismic images;

generating a third flow field between the first and third seismic images;

comparing the third flow field with a combination of the first and second flow fields; and adjusting the first flow field, the second flow field, or both based on the comparison.

19. A computing system, comprising:

at least one processor; and a memory system comprising one or more non-transitory computer-readable media storing instructions that, when executed by at least one of the one or more processors, cause the computing system to perform operations, the operations comprising:

training a machine learning model to generate flow fields based at least partially upon a first training seismic image and a second training seismic image;

receiving a plurality of ordered seismic images comprising representations of objects in a subsurface volume;

generating the flow fields using the trained machine learning model based on a difference between individual images of the plurality of ordered seismic images; and identifying the objects in the seismic images based on the flow fields and the plurality of ordered seismic images.

20. The computing system of claim 19, wherein the operations further comprise:

receiving the first training seismic image;

generating a synthetic flow field;

generating the second training seismic image by combining the first training seismic image with the synthetic flow field;
generating a predicted flow field based on the first training seismic image and the second training seismic image, using the machine learning model;
comparing the predicted flow field with the synthetic flow field; and
training the machine learning model based on the comparison between the predicted flow field and the synthetic flow field.

21. The method of claim 1, further comprising generating a visualization of the objects in a seismic cube, wherein the objects comprise horizons in the subsurface volume.

22. The method of claim 1, further comprising modeling a relative geological time in the subsurface volume based at least partially upon the flow fields, the objects, or both.

* * * * *